United States Patent
Scherer et al.

(10) Patent No.: US 7,802,732 B2
(45) Date of Patent: Sep. 28, 2010

(54) DEVICE AND PROCESS FOR TEMPERATURE REGULATION OF SECTIONS OF THE INTERIOR OF AN AIRCRAFT

(75) Inventors: Thomas Scherer, Hamburg (DE); Torsten Schwan, Pinneberg (DE); Georg Mühlthaler, Hamburg (DE); Jan Dittmar, Buxtehude (DE)

(73) Assignee: Airbus Deutschland GmbH, Hamburg (DE)

( * ) Notice: Subject to any disclaimer, the term of this patent is extended or adjusted under 35 U.S.C. 154(b) by 872 days.

(21) Appl. No.: 10/582,570

(22) PCT Filed: Dec. 30, 2004

(86) PCT No.: PCT/EP2004/014854

§ 371 (c)(1),
(2), (4) Date: Jun. 12, 2006

(87) PCT Pub. No.: WO2005/063575

PCT Pub. Date: Jul. 14, 2005

(65) Prior Publication Data

US 2007/0119584 A1    May 31, 2007

(30) Foreign Application Priority Data

Dec. 30, 2003    (DE) ................... 103 61 709

(51) Int. Cl.
*F24F 11/00* (2006.01)
*F24F 7/00* (2006.01)
*F24F 3/00* (2006.01)
*F24D 19/10* (2006.01)

(52) U.S. Cl. ............... 236/1 B; 236/49.3; 236/91 D; 165/205

(58) Field of Classification Search .............. 236/1 B, 236/49.3, 91 D; 165/205; 62/DIG. 5
See application file for complete search history.

(56) References Cited

U.S. PATENT DOCUMENTS 2,937,011 A * 5/1960 Brahm .................. 165/203

(Continued)

FOREIGN PATENT DOCUMENTS

FR    2485473    12/1981

OTHER PUBLICATIONS

Forms PCT/ISA/210, 220, 237 International Search Report for PCT/EP2004/014854, mailed Apr. 15, 2005.

(Continued)

*Primary Examiner*—Frantz F Jules
*Assistant Examiner*—Travis Ruby
(74) *Attorney, Agent, or Firm*—Wood, Herron, Evans, L.L.P.

(57) ABSTRACT

A device for temperature regulation of sections of the interior of an aircraft includes a controlled mixer valve for the mixing of engine bleed air and air that is cooler than the engine bleed air in order to obtain pre-tempered mixed air flowing out of the mixer valve; a distribution line connected to the outlet of the mixer valve which is connected to the respective sections by at least two supply lines; individual heating units assigned to the respective sections; sensors assigned to the individual sections for the respective actual temperatures; transmitters for the respective nominal temperatures; and a regulator unit which controls the mixer valve dependent upon the respective nominal temperatures and the respective actual temperatures in the individual areas.

13 Claims, 2 Drawing Sheets

U.S. PATENT DOCUMENTS

Figure 1:
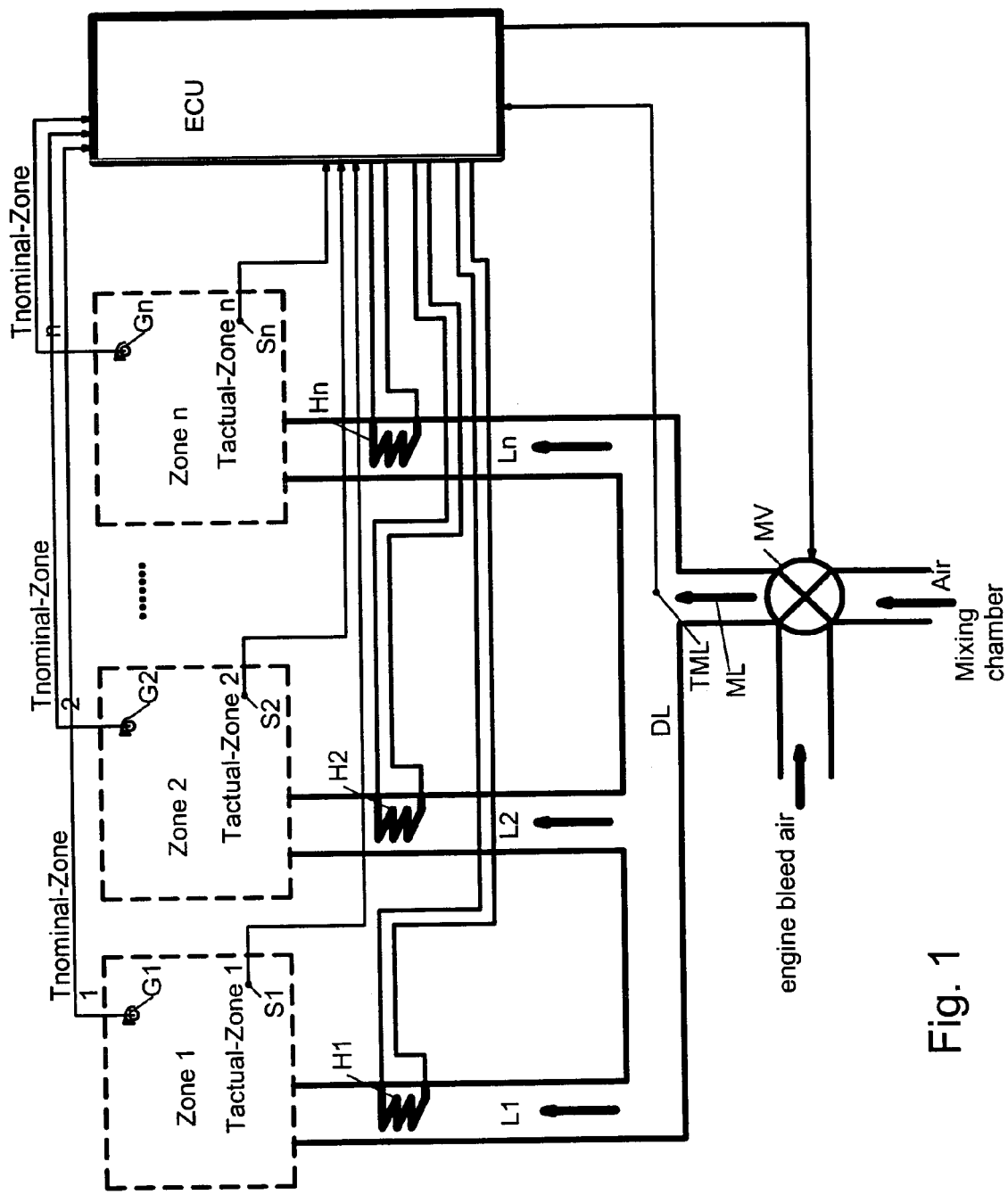

| | | | |
|---|---|---|---|
| 4,013,118 A * | 3/1977 | Zimmer et al. | 165/216 |
| 4,445,342 A * | 5/1984 | Warner | 62/172 |
| 4,531,573 A * | 7/1985 | Clark et al. | 165/216 |
| 5,511,385 A * | 4/1996 | Drew et al. | 62/172 |
| 5,516,330 A | 5/1996 | Dechow et al. | |
| 5,545,084 A * | 8/1996 | Fischer et al. | 454/76 |
| 6,306,032 B1 | 10/2001 | Scheffler et al. | |
| 6,389,826 B2 * | 5/2002 | Buchholz et al. | 62/172 |
| 7,337,623 B2 * | 3/2008 | Fauret | 62/180 |
| 2001/0032472 A1 * | 10/2001 | Buchholz et al. | 62/172 |
| 2003/0141413 A1 | 7/2003 | Brasseur et al. | |

OTHER PUBLICATIONS

English Translation of Decision on Granting a Patent for Invention, Russia Patent Office, Apr. 23, 2009.

* cited by examiner

DEVICE AND PROCESS FOR TEMPERATURE REGULATION OF SECTIONS OF THE INTERIOR OF AN AIRCRAFT

TECHNICAL FIELD

The invention relates to a device and a process for temperature regulation of sections of the interior of an aircraft. The invention particularly relates to a device and a process for temperature regulation of an aircraft cabin into which tempered engine bleed air is introduced from the power unit of the aircraft.

BACKGROUND OF THE INVENTION

In the current state of technology, it is established practice for aircraft cabins to be divided up into different sections or zones. The cabin temperature can be regulated in the individual zones. In order to heat the aircraft cabin, ventilation air taken from a mixing chamber is mixed with hot engine bleed air and then blown into the zone of the cabin in question. Regulation of the cabin temperature is controlled by means of a central cabin temperature regulator. For this, a pre-specified nominal cabin temperature is compared with the actual value shown by a cabin temperature sensor. A control deviation of the cabin temperature results from the difference between the nominal and the actual value. A nominal value for the input air temperature in the cabin is determined by the characteristics of the cabin and the control deviation. This nominal value for the input air temperature is compared with the value measured by a temperature sensor in the input air supply line. A further control deviation for the input air temperature is given by the difference. This control deviation is leveled out by the controlled mixing of hot bleed air by means of a mixer valve.

The known solution is based upon simple heating up of the air supplied to the sections of the cabin, ie. the input air, by mixing in the engine bleed air. This has the following disadvantages:

A mixer valve must be installed for each cabin zone.

A bleed air line to the mixer valve must be installed for each cabin zone. For safety reasons, the installation of a hot air leakage monitoring unit is also associated with this.

For reasons relating to weight, the metal bleed air supply lines must be as short as possible and the mixer valves must therefore be installed near to the wing box. The result of this is that there is a long input air line to each cabin zone with the corresponding weight, and the cost of integrating this input air line into the aircraft.

For each of the mixer valves used, a control outlet on the cabin temperature regulator is required. The number of cabin zones in which the temperature can be regulated is therefore limited to the maximum number of available control outlets.

SUMMARY OF THE INVENTION

The invention therefore arises from the problem of providing a device and a process for regulating temperature in sections of the interior of an aircraft which reduce or eradicate these disadvantages.

The solution to this problem in accordance with the invention consists of a device for regulating the temperature of sections of the interior of an aircraft with a controlled mixer valve for the mixing of engine bleed air and with air which is cooler than the engine bleed air, in order to obtain pre-tempered mixing air flowing out of the mixer valve; a distributor line on the mixer valve outlet which is connected to the sections in question by means of at least two supply lines; separate heating units for each section; sensors for each section to measure the respective actual temperature and transmitters for the respective nominal temperatures; a regulator device which controls the mixer valve dependent upon the respective nominal temperatures and the respective actual temperatures for the individual sections, so that the pre-tempered mixed air is at a temperature which essentially corresponds to the lowest nominal temperature for all the sections and which controls the heating units for the other sections to correspond to the differences between the respective nominal temperatures and the respective actual temperatures.

The invention is therefore based upon the combined heating up of the input air for the sections of the cabin with the help of engine bleed air and additional heating units. The heating unit for the section with the lowest nominal temperature will therefore not be activated because the air heated with the help of engine bleed air will be brought to the lowest nominal temperature for all of the sections.

Utilizing of the invention provides the following advantages:

The required number of bleed air mixer valves is reduced.

The required number and length of the bleed air lines is reduced.

By reducing long input air lines and heavy bleed air lines and mixer valves, there is a reduction in weight.

The number of cabin zones is not limited to the number of mixer valve control outlets available on the cabin temperature regulator.

Additional cabin zones are more easily integrated with this cabin zone structure.

There is greater flexibility for the integration of customer requirements into the air-craft.

Overall, the invention offers great advantages for the integration of additional cabin, temperature zones.

In a preferred version of the invention, the heating units are positioned in the supply lines between the distributor line and the respective sections, preferably close to entrances to the respective sections. It is also possible, however, to position the heating units inside the section in question, preferably close to the supply lines.

Moreover, the heating units are preferably made up of electrical heating elements.

The sensors for the respective actual temperatures in the individual sections and/or in the supply lines are positioned down-current from the heating units. In addition, a sensor for the actual temperature there can be provided down-current of the mixer valve.

The air which is cooler than the engine bleed air supplied to the mixer valve preferably comes from a mixing chamber. When controlling the heating units, the regulator unit preferably takes into account the nominal temperatures, the actual temperatures and a characteristic of each section such as the air volume of the section.

The transmitters, the sensors and/or the heating units can either be coupled with the adjuster unit by means of one or more data buses, or the regulator unit has at least one central section temperature regulator and a decentralised heat regulator for each heating unit, whereby, in this case, the transmitters and the sensors are connected respectively with the central or decentralised regulator.

Finally, the invention relates to a method for regulating the temperature in sections of the interior of an aircraft with the following steps:

Sensing of the respective actual temperatures and the respective nominal temperatures in the individual sections;

Mixing of the engine bleed air and air that is cooler than the engine bleed air in order to obtain pre-tempered mixed air of a temperature which essentially-corresponds to the lowest of the nominal temperatures sensed;

Distribution of the pre-tempered mixed air to all sections; and

Post-tempering of the mixed air distributed to the sections with high nominal temperature corresponding to the differences between the respective nominal temperatures and the respective actual temperatures.

The respective section characteristics can thus be taken into consideration with post-tempering alongside the nominal temperatures and the actual temperatures.

BRIEF DESCRIPTION OF THE DRAWINTS

In the following figures, two embodiments of the invention are illustrated schematically in wiring diagrams:

FIG. 1 schematically shows a first version of the invention in a wiring diagram.

Figure 2:
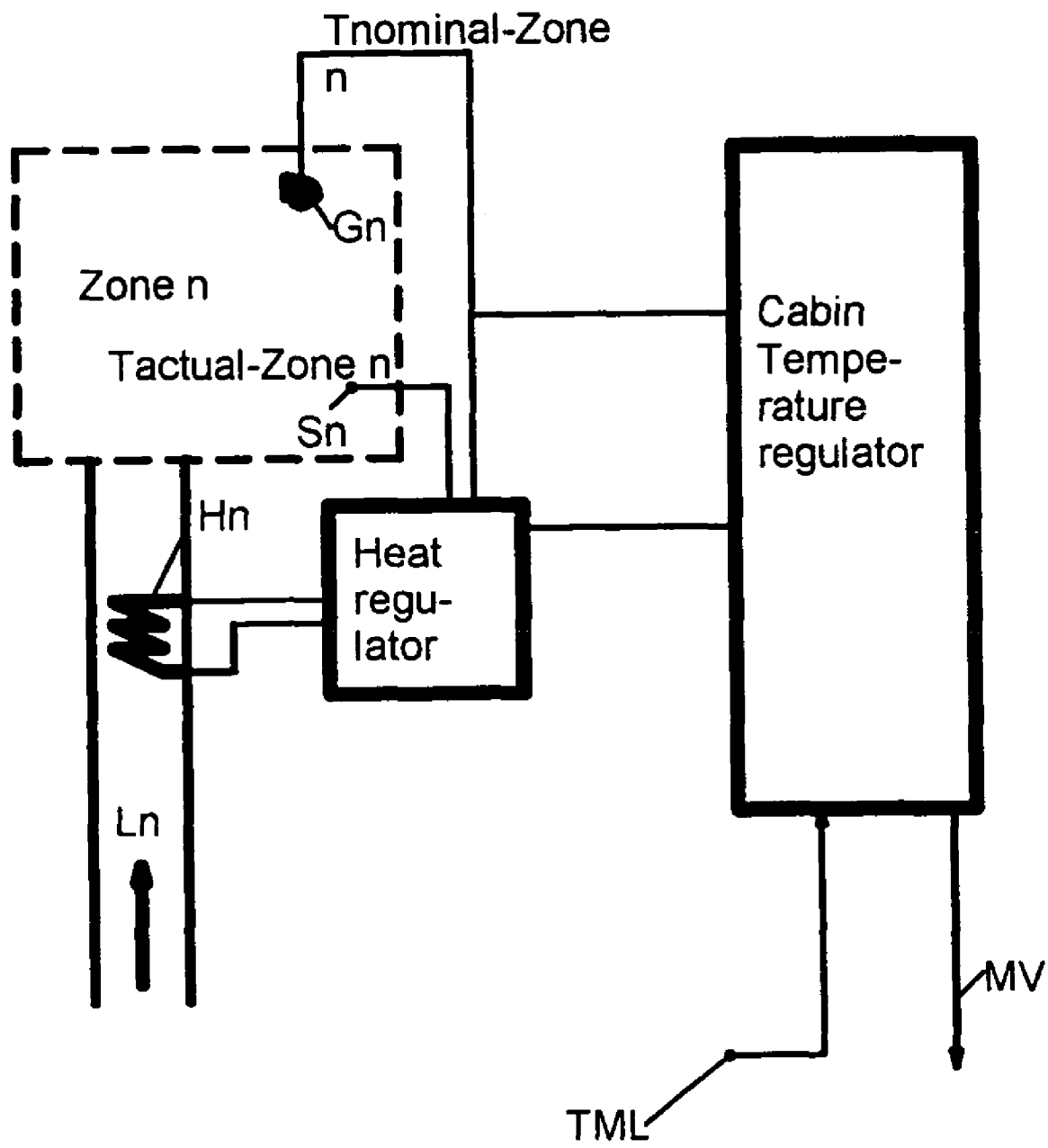

FIG. 2 schematically shows a part of the second version of the invention in a wiring diagram.

DETAILED DESCRIPTION

The device in accordance with the invention illustrated in FIG. 1 serves to regulate the temperature of sections Zone 1, Zone 2, . . . Zone n (shown by hatches) of the interior of an aircraft. This device has a controlled mixer valve MV for the mixing of engine bleed air and air which is cooler than the engine bleed air which comes from a mixing chamber (not illustrated any further). At the outlet of the mixer valve MV pre-tempered mixed air ML flows out. A distribution line DL is connected to the outlet of the mixer valve MV which is connected by at least two supply lines L1, L2, Ln to the respective sections Zone 1, Zone 2, . . . Zone n. In the supply lines L1, L2, Ln close to entrances to the respective sections Zone 1, Zone 2, . . . Zone n, individual electric heating units H1, H2, Hn assigned to the respective sections Zone 1, Zone 2, . . . Zone n are positioned. In the individual sections Zone 1, Zone 2, . . . Zone n, the temperature sensors S1, S2, . . . Sn assigned to these are positioned for the respective actual temperatures Tactual-Zone 1, Tactual-Zone 2, . . . Tactual-Zone n. Moreover, in the individual sections Zone 1, Zone 2, . . . Zone n, manually operated transmitters G1, G2, . . . Gn are either also provided for the respective nominal temperatures Tnominal-Zone 1, Tnominal-Zone 2, . . . Tnominal-Zone n, or these transmitters G1, G2, . . . Gn are provided at a central point. Moreover, the transmitters G1, G2 . . . Gn can also be electronically adjustable signal transmitters.

The device also includes a regulator device ECU where signals from the transmitters G1, G2, . . . Gn and from the temperature sensors S1, S2, . . . Sn are stored, and which controls the mixer valve MV and the heating devices H1, H2, Hn. The mixer valve MV dependent upon the respective nominal temperatures Tnominal-Zone 1, Tnominal-Zone 2, . . . Tnominal-Zone n and the respective actual temperatures Tactual-Zone-1, Tactual-Zone 2, . . . Tactual-Zone n of the individual sections Zone 1, Zone 2, . . . Zone n is controlled in such a way that the pre-tempered mixed air ML is at a temperature which essentially corresponds to the lowest of the nominal temperatures Tnominal-Zone 1, Tnominal-Zone 2, . . . Tnominal-Zone n of all sections Zone 1, Zone 2, . . . Zone n. In addition, the temperature of the mixed air ML is recorded by the temperature sensor TML and a corresponding signal stored in the regulator unit ECU in order to determine the control signal for the mixer valve MV. The heating units H1, H2 . . . Hn assigned to the other sections Tnominal-Zone 1, Tnominal-Zone 2, . . . Tnominal-Zone n are controlled corresponding to the differences between the respective nominal temperatures Tnominal-Zone 1, Tnominal-Zone 2, . . . Tnominal-Zone n and the respective actual temperatures Tactual-Zone 1, Tactual-Zone 2, . . . Tactual-Zone n. Here, the heating unit assigned to the section with the lowest nominal temperature is not activated. With the other sections with the higher nominal temperatures, the respective temperature difference between the nominal and actual temperature is evened out by synchronisation of the electric heating units. In this way, the temperature requirements for these sections are also fulfilled.

The temperature sensors S1, S2, . . . Sn for the respective actual temperatures Tactual-Zone 1, Tactual-Zone 2, . . . Tactual-Zone n are positioned in the individual sections Zone 1, Zone 2, . . . Zone n and/or in the supply lines L1, L2, . . . Ln down-current from the heating units H1, H2, . . . Hn.

In the regulator unit ECU, characteristics of the respective sections Zone 1, Zone 2, . . . Zone n are stored which are taken into consideration alongside the input-variable nominal temperatures Tnominal-Zone 1, Tnominal-Zone 2, . . . Tnominal-Zone n and the actual temperatures Tactual-Zone 1, Tactual-Zone 2, . . . Tactual-Zone n for the control of the heating units H1, H2, . . . Hn.

In FIG. 1, a device in accordance with the invention is illustrated whereby the transmitters G1, G2, . . . Gn, the temperature sensors TML, S1, S2, . . . Sn and/or the heating units H1, H2, . . . Hn and the controlled mixer valve MV are connected directly to a central regulator unit ECU. On the other hand, FIG. 2 shows a hierarchical regulator concept, whereby these components are coupled to the regulator unit ECU by means of one or several data buses, whereby the regulator unit ECU has at least one central section temperature regulator and a decentralised heat regulator for each heating unit H1, H2, . . . Hn. The heating units H1, H2, . . . Hn and their respective decentralized heat regulators each have local temperature sensors, S1, S2, . . . Sn and are connected by means of a data bus to a central cabin temperature regulator which also receives the signals from the transmitters G1, G2, . . . Gn by means of this or another data bus.

In order to optimise the regulator quality, the temperature sensor TML is positioned as close as possible in front of the heating units H1, H2, . . . Hn (ie. down-current), and the temperature sensors S1, S2, . . . Sn are positioned in the interior of the respective sections. It is, however, also possible to dispense with the temperature sensor TML and to determine the lowest nominal temperature requirement from the temperature sensors S1, S2, . . . Sn alone in order to control the mixer valve MV correspondingly.

In this way, both sections or cabin zones are supplied with air from the mixing chamber by a line. After mixing engine bleed air in the mixer valve, the line separates out into separate input air lines for each cabin zone. In order to heat up the flow of air further, the input air is routed through electric heating units. Temperature regulation of both cabin zones is realised both by the central cabin temperature regulator and the decentralized heating regulators. The heating regulators here determine an nominal value for the input air temperature of the zone in question from the pre-specified nominal value and the value of the cabin zone temperature measured and the zone characteristics. These nominal values are communicated to the central cabin regulator by means of a data bus.

The cabin regulator assesses this information and, with the help of the bleed air mixer valve, sets the lowest of the two in-put air nominal values which have been received. For the zone with the lowest input air nominal value, the temperature requirement is thus fulfilled and the electrical heating unit is not powered. With the other cabin zones with the higher input air nominal values, the difference between the electrical heating units is evened out by synchronisation. In this way, the temperature requirements for these zones are fulfilled as well.

The temperature regulation method which forms the basis for the invention is based upon the following steps:
recording of the actual and nominal temperatures in the individual sections;
mixing of the hot engine bleed air with cooler air in order to obtain mixed air of a temperature which essentially corresponds to the lowest of the nominal temperatures recorded; and—post-tempering of the mixed air distributed to the sections with the higher nominal temperature corresponding to the differences between the respective nominal and actual temperatures. In this way, respective section characteristics can be taken into consideration for post-tempering.

In summary, the input air can be pre-heated for numerous zones by means of a common bleed air mixer valve.

We claim:

1. A device for regulating the temperature of individual sections of the interior of an aircraft comprising:
   a controlled mixer valve for the mixing of engine bleed air with air cooler than the engine bleed air in order to obtain pre-tempered mixed air flowing out of the mixer valve;
   a distribution line connected to the outlet of the mixer valve and connected with the individual sections by respective supply lines;
   individual heating units assigned to respective individual sections and adapted to heat the pre-tempered mixed air flowing in the respective supply lines;
   sensors assigned to the individual sections for sensing respective actual temperatures in the individual sections;
   transmitters assigned to the individual sections for identifying respective nominal temperatures in the individual sections;
   a regulator unit operatively connected to the heating units, the sensors, the transmitters, and the mixer valve, and which controls the mixer valve dependent upon the respective nominal temperatures and the respective actual temperatures of the individual sections such that the pre-tempered mixed air is of a temperature which corresponds to the lowest of the nominal temperatures of all of the individual sections, the regulator unit also controlling each of the heating units assigned to other individual sections with higher respective nominal temperatures according to the difference between the identified nominal temperature and the sensed actual temperature of the respective individual section.

2. Device in accordance with claim 1, characterized in that the heating units are disposed in the supply lines and are positioned adjacent to entrances to the respective individual sections.

3. Device in accordance with claim 1, characterized in that the heating units are electric heating elements.

4. Device in accordance with claim 1, characterized in that the sensors for the respective actual temperatures are positioned in the individual sections or in the supply lines downstream from the heating units.

5. Device in accordance with claim 1, characterized in that the air which is cooler than the engine bleed air and supplied to the mixer valve comes out of a mixing chamber.

6. Device in accordance with claim 1, characterized in that the regulator unit takes into consideration the nominal temperatures, the actual temperatures and characteristics of the respective individual sections for the control of the heating units.

7. Device in accordance with claim 1 characterized in that the transmitters, the sensors and the heating units are coupled to the regulator unit by at least one data bus.

8. Device in accordance with claim 1, characterized in that the regulator unit has at least one centralized section temperature regulator and a decentralized heat regulator for each heating unit.

9. Device in accordance with claim 1, characterized in that the nominal temperatures of the respective individual sections is set manually.

10. Process for regulating the temperature of individual sections of the interior of an aircraft comprising:
    identifying respective actual temperatures and respective nominal temperatures of the individual sections;
    mixing engine bleed air and air which is cooler than the engine bleed air in order to obtain pre-tempered mixed air at a temperature which corresponds to the lowest of the identified nominal temperatures;
    distributing the pre-tempered mixed air to all of the individual sections; and
    post-tempering the mixed air distributed to the individual sections with higher nominal temperatures than the lowest of the respective nominal temperatures, by heating the mixed air with individual heating units according to the differences between the respective nominal temperatures and the respective actual temperatures.

11. Process in accordance with claim 10, which takes into consideration the nominal temperatures, the actual temperatures, and respective individual section characteristics for post-tempering.

12. Process in accordance with claim 10, further comprising:
    setting the nominal temperatures of the individual sections manually.

13. Process in accordance with claim 10, characterized in that the pre-tempered mixed air is distributed to all of the individual sections by a distribution line connected with the individual sections by respective supply lines, the individual heating units being disposed in the respective supply lines.

* * * * *